United States Patent [19]

Schank

[11] Patent Number: 5,582,225

[45] Date of Patent: Dec. 10, 1996

[54] DUST FREE WORK BENCH

[76] Inventor: Earle Schank, 420 13th St., Hammonton, N.J. 08037

[21] Appl. No.: 445,889

[22] Filed: May 22, 1995

[51] Int. Cl.$^6$ .............................. B26D 7/06; B27G 21/00; B27C 5/10

[52] U.S. Cl. ............... 144/286.1; 83/98; 83/100; 144/252.1; 144/286.5; 409/253; 451/453; 451/456

[58] Field of Search ..................... 83/98, 99, 100; 29/DIG. 102; 451/453, 456; 409/136, 253; 144/286 R, 286 A, 252 R, 252 R, 252.1, 252.2, 286.1, 286.5

[56] References Cited

U.S. PATENT DOCUMENTS

| D. 251,167 | 2/1979 | Isles | D6/177 |
|---|---|---|---|
| D. 254,112 | 2/1980 | Handler et al. | D6/179 |
| 2,140,838 | 12/1938 | Hart | 409/253 |
| 3,470,679 | 10/1969 | Ramsey | 55/473 |
| 3,880,047 | 4/1975 | Dosier | 451/456 |
| 3,905,273 | 9/1975 | Shook | 451/456 |
| 4,201,256 | 5/1980 | Thuhan | 144/252 A |
| 4,408,642 | 10/1983 | Jeruzal et al. | 144/286 A |
| 4,697,389 | 10/1987 | Romine | 451/456 |
| 4,759,155 | 7/1988 | Shaw | 451/456 |
| 4,928,440 | 5/1990 | Hughes | 451/456 |
| 5,131,192 | 7/1992 | Cheng | 51/273 |
| 5,211,092 | 5/1993 | Blasi | 83/98 |
| 5,237,896 | 8/1993 | Albright et al. | 83/100 |
| 5,323,821 | 6/1994 | Suzuki | 144/286 A |

*Primary Examiner*—W. Donald Bray
*Attorney, Agent, or Firm*—David L. Baker; Rhodes & Ascolillo

[57] ABSTRACT

The invention is a workbench consisting of a top working surface containing a rows and columns of holes that allow dust and chips to fall and be drawn through where they land in a plenum below the surface. The top surface and the plenum are supported by a rectangular frame that includes four legs and a shelf between the plenum and the bottom of the legs. The shelf supports a doorless cabinet that includes areas for storing tools and supplies. The plenum slopes to a point containing an off center aperture which is connected through an adapter to a vacuum cleaner. The vacuum cleaner has a bifurcated input manifold with gate valves which allows the user to select between applying the vacuum to the plenum or applying the vacuum to a hose containing a vacuum cleaning tool where waste not entering the surface apertures will be removed from the top work surface.

8 Claims, 3 Drawing Sheets

DUST FREE WORK BENCH

BACKGROUND OF THE INVENTION

1. Field of the Invention

This invention relates generally to a work bench for wood workers and in particular to such a work bench that is easily cleaned and remains relatively dust free.

2. Description of the Prior Art

The fine art of woodworking, whether accomplished by hobbyist or a craftsman, involves generating substantial waste in the form of chips and dust from sanding and cutting. The typical shop is thought of as having a residual coating of dust which, while adding to the ambiance and perhaps the creativity of the shop worker, is hazardous in terms of fire, explosive potential and the ingestion of airborne particles. The removal of sawdust and wood chips is important from both the safety factor and the worker comfort point of view.

Prior art attempts to address the clean air problem in shops include the following U.S. Patents:

U.S. Pat. No. 3,470,679 issued Oct. 7, 1969 to Ramsey shows a workbench with a filtered laminar flow of clean air. The invention is concerned with providing a clean atmosphere in which to perform certain work functions. U.S. Design Pat. No. Des. 251,167 issued Feb. 27, 1979 to Isles shows a typical cantilevered work bench.

U.S. Design Pat. No. Des. 254,112 issued Feb. 5, 1980 to Handler et al. shows another form of work bench with a four legs, shelves vertically arranged between the legs and a bench top with a vertical peg board for storing tools and equipment.

U.S. Pat. No. 5,131,192 issued Jul. 21, 1992 to Cheng directed to a dust arrester for a sanding machine which includes a hollow workbench and a tubular filter unit which is axially rotatable inside the workbench. A suction unit draws the dust into the workbench while a blower unit directs it into a removable dust removing bin.

The cited prior art whether taken alone or in combination other well known art fails to anticipate the invention disclosed and claimed herein.

SUMMARY OF THE INVENTION

The invention is a dust free work bench and is characterized by a planar top surface supported by four legs one positioned in each corner of the rectangular top surface. The legs are connected by a frame which supports a plenum that is mounted in underlying cooperation with the planar top. The top surface contains a plurality of apertures arranged in rows and columns which cover the entire surface. Dust and small chips that land on the surface will tend to fall by gravitational force into the plenum. In the normal course of working on the top surface the waste material will be moved around and a substantial part will be moved over an aperture where it will fall into the plenum.

The surface of the plenum slopes to an aperture which is located along the longitudinal axis of the work bench and closer to one end. The outlet of the plenum is formed at the aperture and includes an adapter that will connect to a source of high volume vacuum. At a level below the plenum is a shelf connected between the four legs on which are mounted a plurality of compartments for storing equipment and supplies. In addition the shelf has at one end an arcuate section removed to allow the removable placement of a source of high volume vacuum. This source may be a type of vacuum cleaner referred to as a "shop-vac". The "shop-vac" could be electrically connected to an outlet strip attached to the frame of the bench. The vacuum inlet is bifurcated and each arm of the inlet is controlled by a gate valve. One arm of the vacuum inlet is connected by flexible tubing to the outlet adapter of the plenum. The second arm of the vacuum inlet is connected to a flexible tube that will be mounted in a convenient location near the perimeter of the table top. The distal end of the tube is adapted to receive conventional vacuum cleaning tools including a wand or a brush.

In use the gate valve to the plenum is normally open thereby drawing in the dust and particles that drop through the top surface. The gate valve to the cleaning tool is closed. In the alternative operation, the gate valves are in the opposite condition and the valve to the plenum is closed and the valve to the tools is open. This allows the user to remove dust and particles too large for the apertures in the top surface and in addition the tool could be used to remove dust from the workpiece.

If desired the "shop-vac" could be disconnected from the plenum and moved about the shop and used in a conventional manner as a vacuum cleaner.

It is therefore an object of the invention to provide a new and improved dust free workbench.

It is another object of the invention to provide a new and improved dust free workbench that has all the advantages of prior art similar work benches and none of the disadvantages.

It is a further object of the invention to provide a new and improved dust free workbench that will provide a working surface for use with any material that creates dust or small chips and particle waste.

It is still another object of the invention to provide a new and improved dust free workbench that may be easily and efficiently manufactured and marketed.

It is still a further object of the invention to provide a new and improved dust free workbench that is of a durable and reliable construction.

It is another object of the invention to provide a new and improved dust free workbench that is formed of readily available parts and pieces and accordingly is low in cost of manufacture and in sale price to the consuming public.

These, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

DETAILED DESCRIPTION OF A PREFERRED EMBODIMENT

Figure 1:
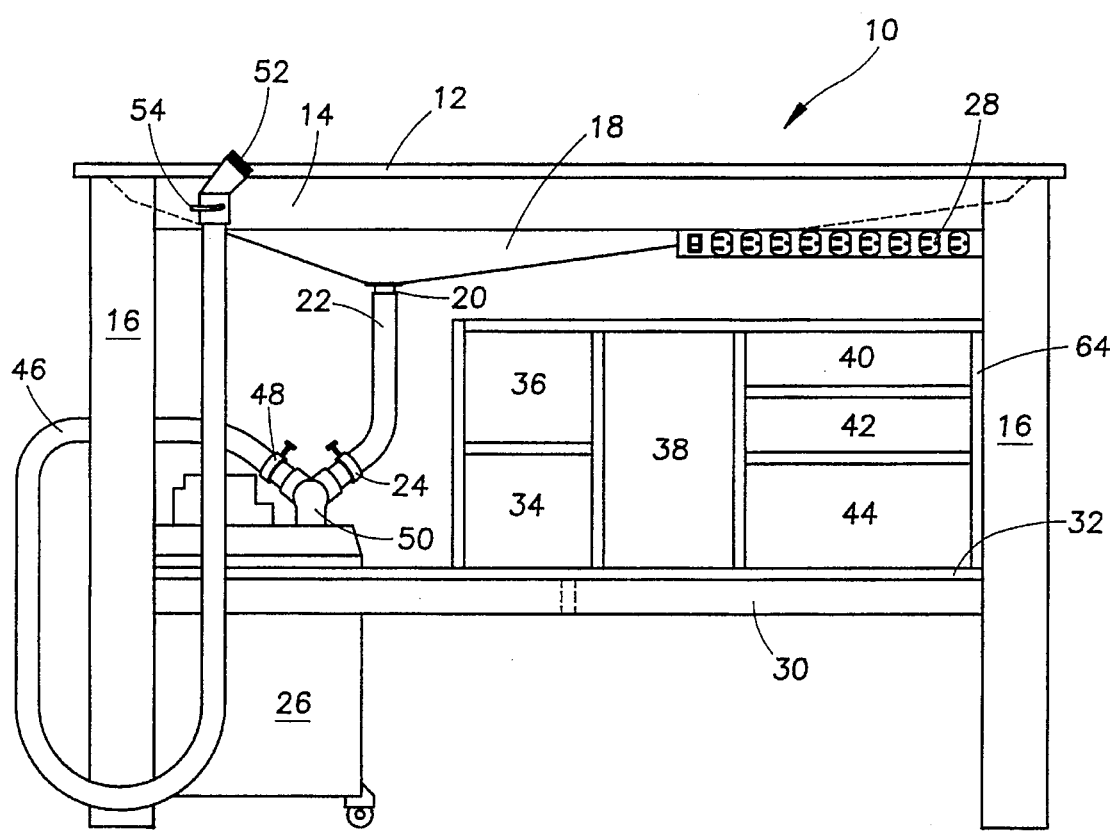
FIG. 1 is an elevation view of the front of the workbench.

Referring now to FIG. 1, the workbench of the invention is shown generally as 10. The invention consists of a top planar surface 12 supported by a frame with side members 14 and legs 16. Below the top surface 12 is a plenum 18 having sloping sides which have a nadir at an aperture which contains an adapter 20 for connection of a vacuum hose 22. The vacuum hose 22 is connected through a gate valve 24 to the input of a vacuum generator 26 such as a well known and readily available "shop-vac" vacuum cleaner via the bifurcated vacuum generator input manifold 50. A series of electrical outlets 28 are connected to the side member 14 and are used to provide power for the "shop-vac" and other power tools. A second supporting frame is shown by one side member 30 and is connected to the legs 16 and support a shelf 32. Shelf 32 contains a doorless cabinet that consists of areas 34,36,38 for storing tools and areas 40,42 for storing sand paper, for example. Area 44 is for storing other miscellaneous hand tools.

Included with the vacuum generator is a second input hose 46 connected through gate valve 48 which is connected to the bifurcated vacuum generator input manifold 50. The hose is adapted to receive assorted conventional tools such as the brush 52. As a matter of convenience hose 46 is removably attached to the bench by a hanger 54.

Figure 2:
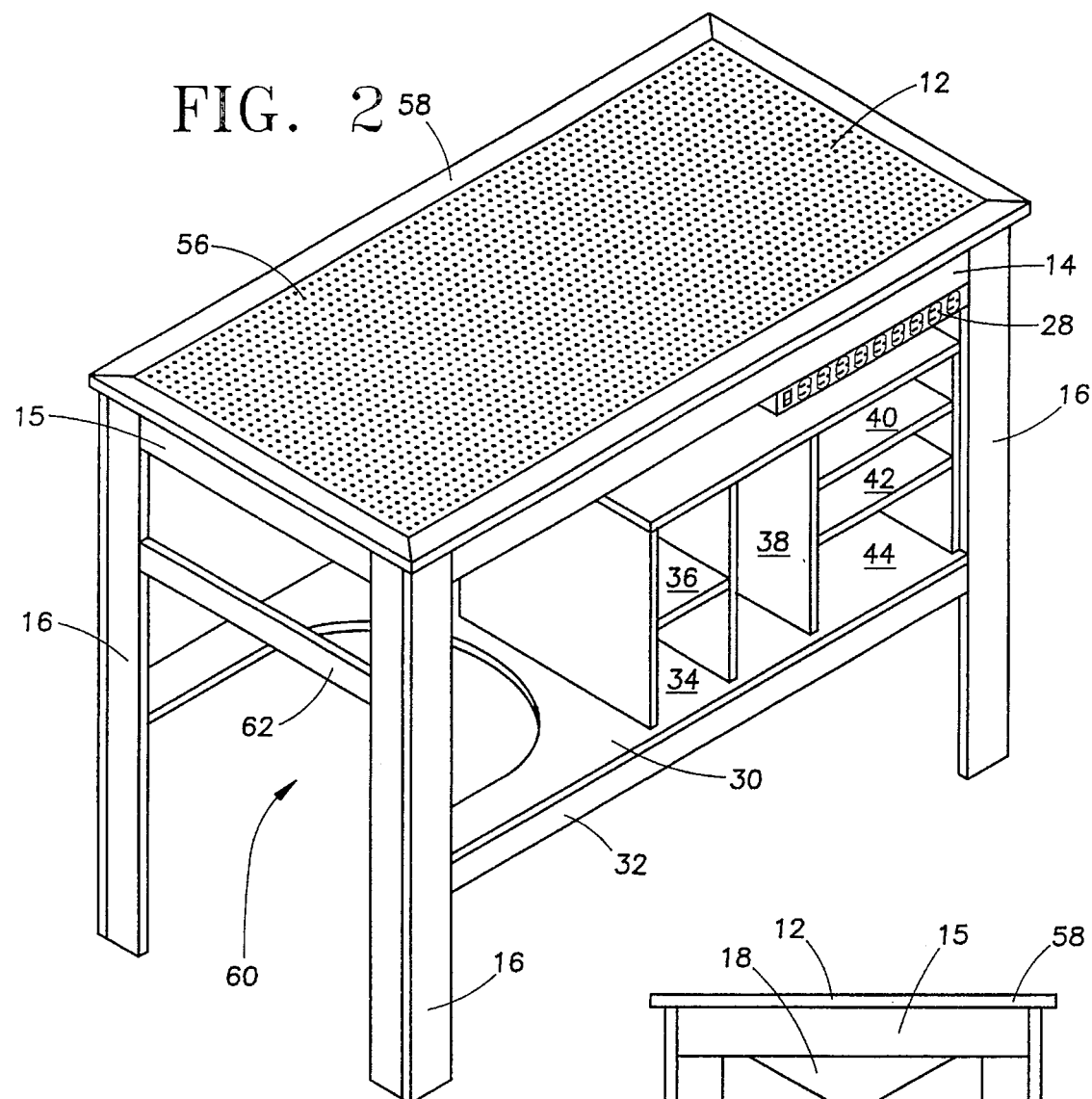
FIG. 2 is a perspective view of the workbench.

Referring now to FIG. 2, the top surface of the workbench 12 includes rows and columns of apertures 56 through which dust and small chips of material drop, entering the plenum 18. The top surface 12 is supported by the side frame members 14 and end frame members 15 which also support the plenum 18. A border of material 58 follows the perimeter of the work bench and secures the top surface and the plenum to the support frame. Lower shelf 32 contains an arcuate recess 60 for removably installing the vacuum generator. Leg support member 62 is positioned such that the generator may be conveniently rolled into and out of the recessed area.

Figure 3:
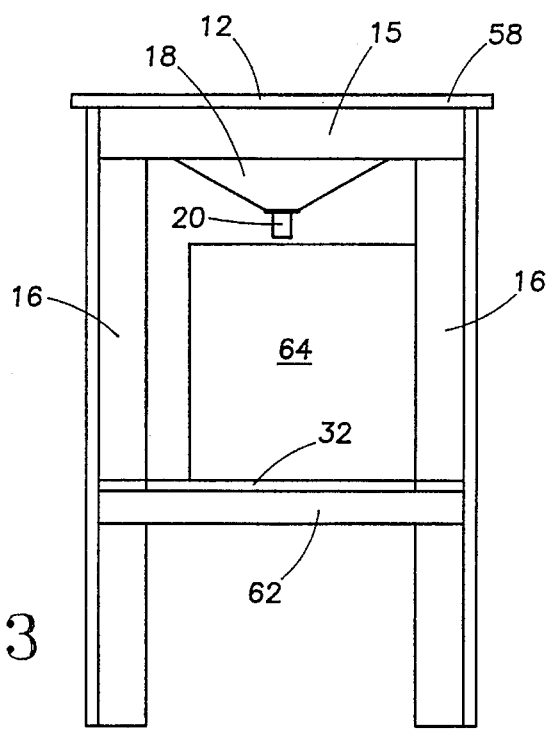
FIG. 3 is a right side elevation view of the workbench.

FIG. 3 is an end view showing the detail of the support frame members 15 and 62 which join the legs 16 at one end of the workbench. The end wall 64 of the doorless cabinet is shown resting on the shelf 32.

Figure 4:
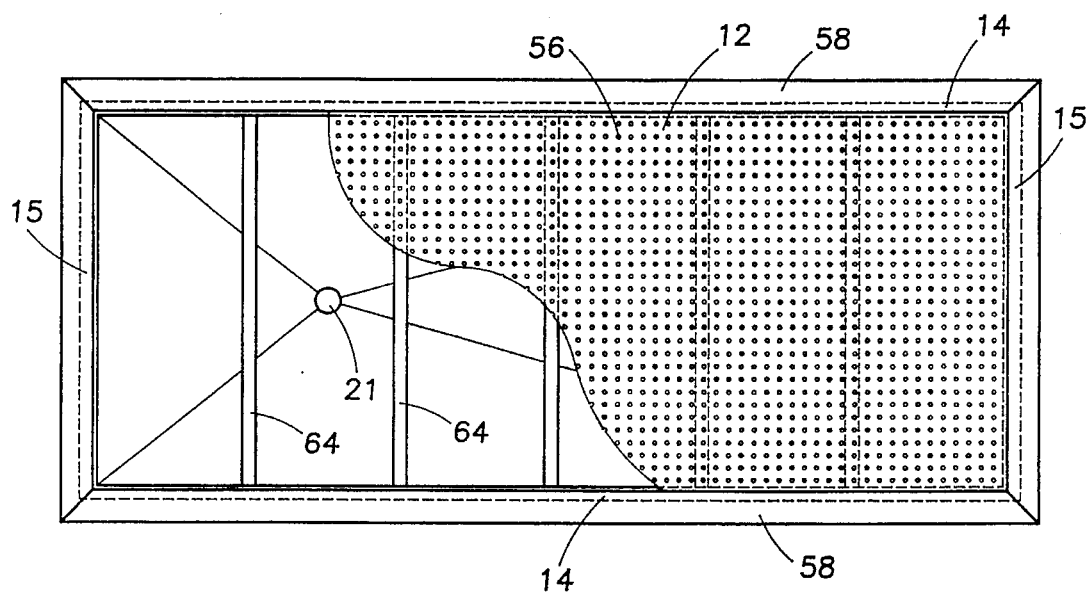
FIG. 4 is a top plan view of the top surface of the workbench.
Figure 5:
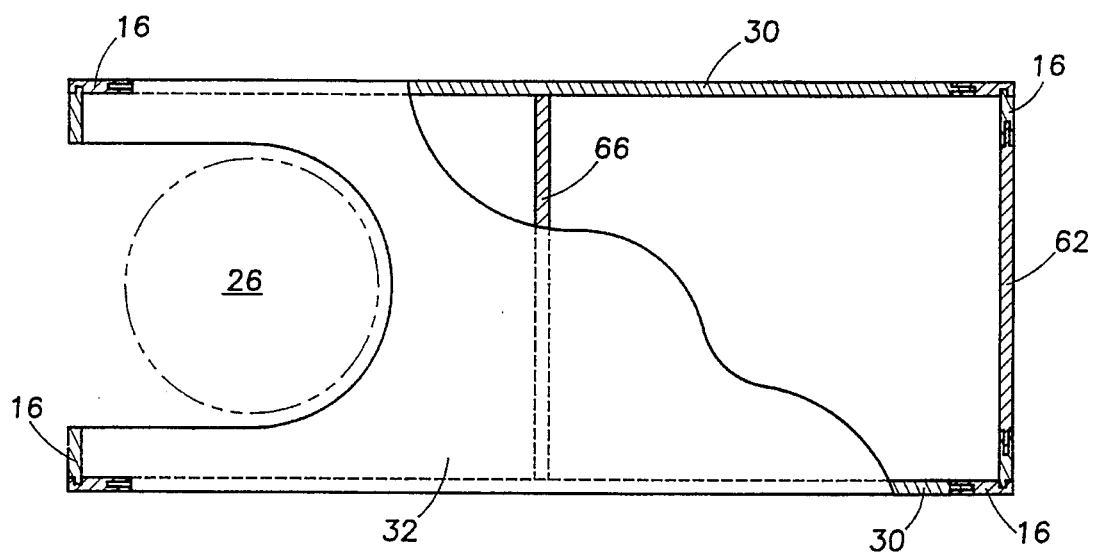
FIG. 5 is a top plan view of the shelf of the invention cut away in part.

FIGS. 4 and 5 disclose the detail of the top surface 12 and the shelf 32. The top surface 12 is supported around the perimeter by the frame members 14 and 15. Border 58 secures the top surface to the frame in a conventional manner as by nail or screw fasteners or by the application of adhesive. Lying athwart the longitudinal axis of the workbench and parallel to the end support members 15 are a plurality of support members 64 which provide additional support for the top surface 12. Aperture 21 is formed in the plenum at the lowest point with all walls sloping toward the aperture.

In operation, with the vacuum generator 26 attached to the adapter 20 via hose 22 and gate valve 24 open, particles of material and dust will fall and be drawn into the plenum and removed into the vacuum generator. Pieces of material and dust remaining on the top surface will be removed by the tool attached to the hose 46 when the gate valve 48 is opened. Shelf 32 is supported by the side frame members 30, end frame member 62 and mid-frame cross member 66.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A dust free workbench comprising:

a rectangular frame;

a plurality of legs supporting the frame above a permanent surface;

a plenum positioned within and supported by the frame;

a top surface covering the plenum;

said surface including a plurality of spaced apertures in rows and columns covering the entire surface above the plenum, whereby dust and small particles on the top surface will drop into the plenum, and aperture means in said plenum, closer to one end than the opposed end for evacuating dust and small particles collected from the top surface;

a border for securing the plenum and top surface to the frame;

the plenum includes surfaces that slope from the frame to the aperture means;

adapter means connected to the plenum aperture for connecting a vacuum generating means;

a vacuum generating means connected to the plenum chamber for evacuating the contents of the plenum and drawing dust laden air above the surface of the table into the dust collecting vacuum means; and a dust collecting vacuum means having a bifurcated hose inlet adapter.

2. A dust free work bench according to claim 1 further including a first and second gate valve located on the first and second hose inlet adapters.

3. A dust free work bench according to claim 2 wherein: a first inlet hose is connected to the plenum aperture adapter.

4. A dust free work bench according to claim 3 wherein: a second inlet hose is connected to a working tool and removably suspended by a support attached to the frame.

5. A dust free workbench according to claim 4 further including: a shelf, coplanar with the top surface, supported by the said legs and positioned midway between the top surface and the permanent surface.

6. A dust free workbench according to claim 5 wherein: the shelf contains a recess at one end adapted to receive a dust collecting vacuum means.

7. A dust free workbench according to claim 6 wherein: the shelf contains a cabinet for storing equipment and supplies.

8. A dust free workbench according to claim 7 wherein: the plurality of legs includes four legs, one positioned at each corner of the frame.

\* \* \* \* \*